US007916461B2

(12) United States Patent
Sip et al.

(10) Patent No.: US 7,916,461 B2
(45) Date of Patent: Mar. 29, 2011

(54) ELECTRONIC DEVICE WITH ROTATABLE KEYBOARD

(75) Inventors: Kim-Yeung Sip, Shenzhen (CN); Feng-Xiang Tang, Shenzhen (CN); Xiong Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 80 days.

(21) Appl. No.: 12/538,838

(22) Filed: Aug. 10, 2009

(65) Prior Publication Data

US 2010/0321872 A1    Dec. 23, 2010

(30) Foreign Application Priority Data

Jun. 18, 2009    (CN) .......................... 2009 1 0303426

(51) Int. Cl.
*G06F 1/16* (2006.01)
*H05K 5/00* (2006.01)
*H05K 7/00* (2006.01)

(52) U.S. Cl. ........... 361/679.2; 361/679.08; 361/679.09; 455/575.1

(58) Field of Classification Search .. 361/679.08–679.2; 455/575.1–575.4, 575.8
See application file for complete search history.

(56) References Cited

U.S. PATENT DOCUMENTS

| 5,635,928 | A | * | 6/1997 | Takagi et al. | 341/22 |
| 5,774,384 | A | * | 6/1998 | Okaya et al. | 345/169 |
| 6,314,274 | B1 | * | 11/2001 | Kumagai | 455/90.3 |
| 6,590,565 | B2 | * | 7/2003 | Hosoya | 345/168 |
| 7,084,786 | B2 | * | 8/2006 | Kaino et al. | 341/22 |
| 7,158,373 | B2 | * | 1/2007 | Smith | 361/679.18 |
| 7,395,100 | B2 | * | 7/2008 | Cha et al. | 455/575.1 |
| 2003/0080880 | A1 | * | 5/2003 | Kaino et al. | 341/22 |
| 2004/0224732 | A1 | * | 11/2004 | Lee et al. | 455/575.3 |
| 2006/0098403 | A1 | * | 5/2006 | Smith | 361/683 |
| 2006/0159507 | A1 | * | 7/2006 | Jawerth et al. | 400/472 |
| 2007/0280658 | A1 | * | 12/2007 | Ho | 396/48 |
| 2009/0195507 | A1 | * | 8/2009 | Fujino et al. | 345/168 |
| 2009/0209301 | A1 | * | 8/2009 | Lin et al. | 455/575.1 |

* cited by examiner

*Primary Examiner* — Jayprakash N Gandhi
*Assistant Examiner* — Adrian S Wilson
(74) *Attorney, Agent, or Firm* — Zhigang Ma

(57) ABSTRACT

An electronic device with a rotatable keyboard is provided. The electronic device includes a casing defining a plurality of button holes, and a pressable plate having a plurality of transparent pressable protrusions. Each of the pressable protrusions exposes itself through a corresponding button hole of the casing for a user to press the pressable protrusions to input commands to the electronic device. The electronic device further includes at least one rotatable member mounted in the base. A plurality of touch points are arranged on each surfaces of the rotatable member. The electronic device further includes a transmission mechanism and a knob. The knob is for driving the transmission mechanism, and the transmission mechanism is for rotating the rotatable member to make one surface of the at least one rotatable member face the pressable plate and the touch points on the surface being touchable by the user.

10 Claims, 8 Drawing Sheets

ELECTRONIC DEVICE WITH ROTATABLE KEYBOARD

BACKGROUND

1. Technical Field

The disclosure relates to electronic devices and, particularly, to an electronic device with a rotatable keyboard.

2. Description of Related Art

A keyboard is usually used to input commands to a portable electronic device, such as a mobile phone, a PDA and so on. With the development of these electronic devices, these electronic devices have more and more functions, such as e-mail, word processing and so on. In order to better execute various functions of these electronic devices, particularly, to better execute word processing, a keyboard with all alphanumeric buttons similar to a standard computer keyboard may be needed. However, including this kind of keyboard will increase the bulkiness of such an electronic device.

BRIEF DESCRIPTION OF THE DRAWINGS

The components of the drawings are not necessarily drawn to scale, the emphasis instead being placed upon clearly illustrating the principles of an electronic device with a rotatable keyboard. Moreover, in the drawings, like reference numerals designate corresponding parts throughout several views.

DETAILED DESCRIPTION

Figure 1:
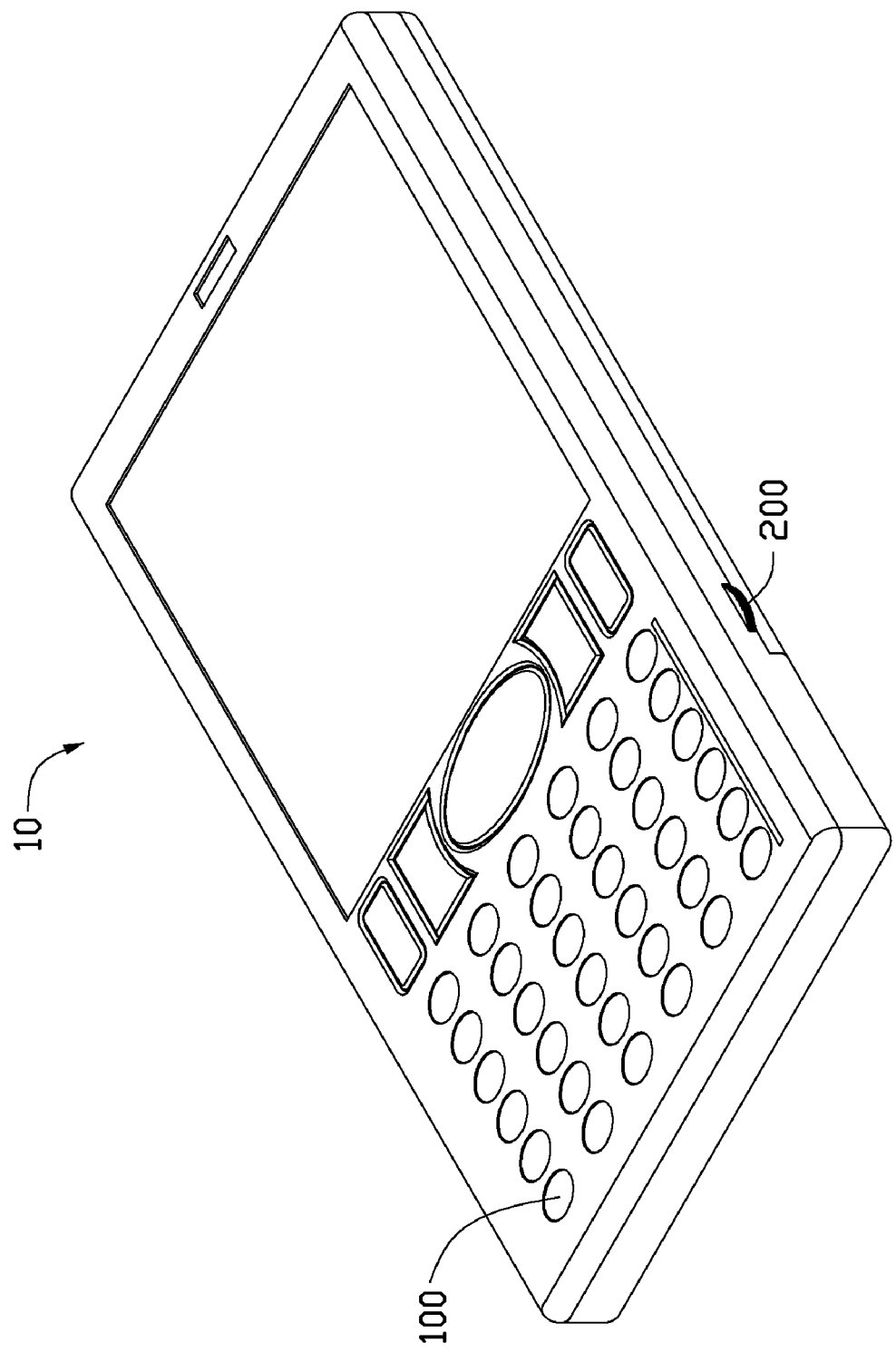
FIG. 1 is an isometric view of an electronic device with a rotatable keyboard in accordance with an exemplary embodiment.

Referring to FIG. 1, an embodiment of an electronic device 10 is illustrated. The electronic device 10 includes a plurality of buttons 100 and a knob 200. The knob 200 is rotatable in a rotation range and can be set at two or more particular positions defined in the rotation range. At each particular position of the knob 200, different symbols for the buttons 100 are displayed, which correspond to predetermined programmed inputs of the buttons 100 when pressed. For example, when the knob 200 is set to at a first position, the displayed symbols of the buttons 100 may be capital letters and numbers. When the knob 200 is set to a second position, the displayed symbols of the buttons 100 may be lowercase letters and symbols corresponding to functions such backspace, delete, and so on.

Figure 2:
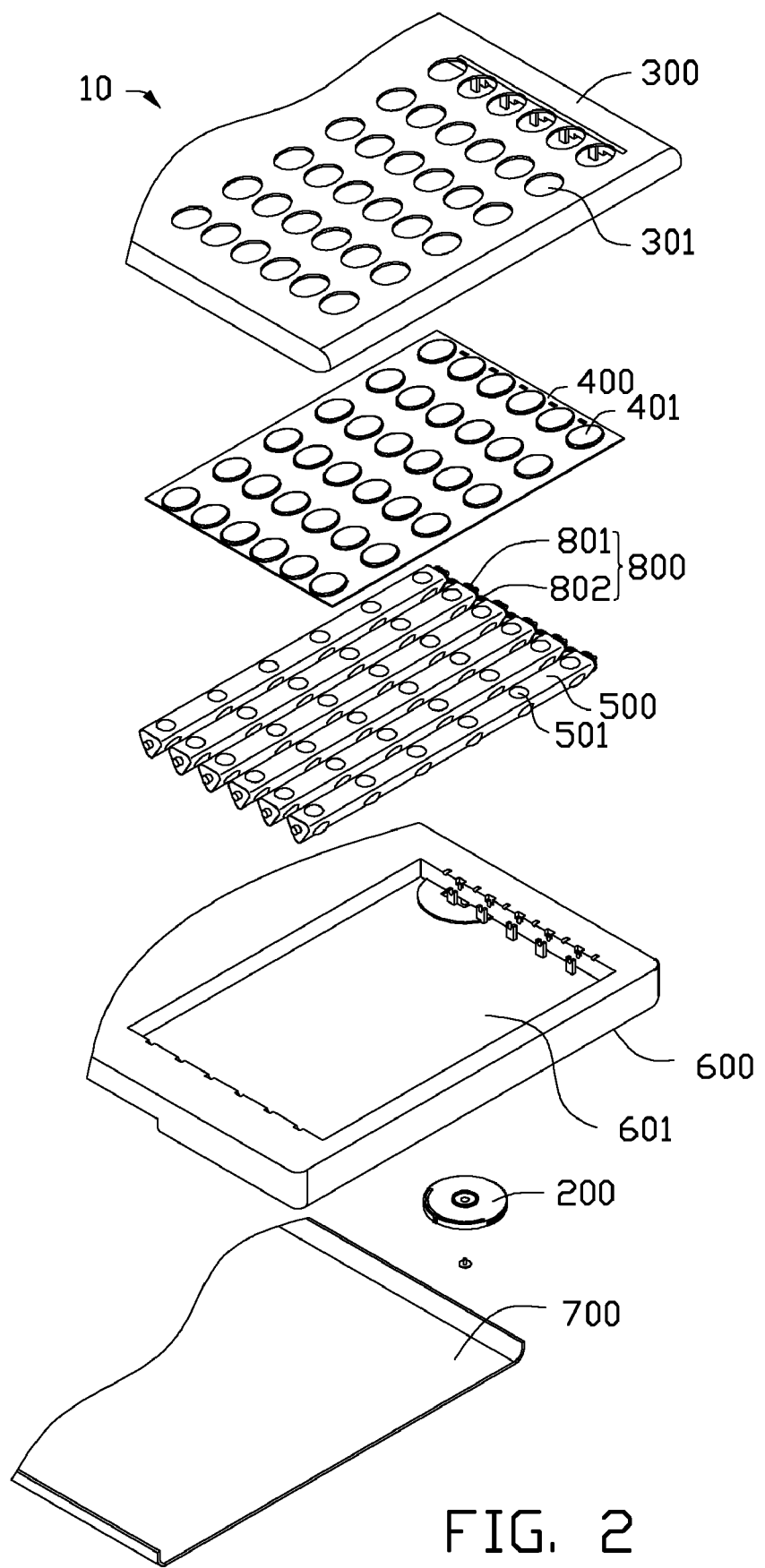
FIG. 2 is a partial, exploded perspective view of the electronic device of FIG. 1.
Figure 3:
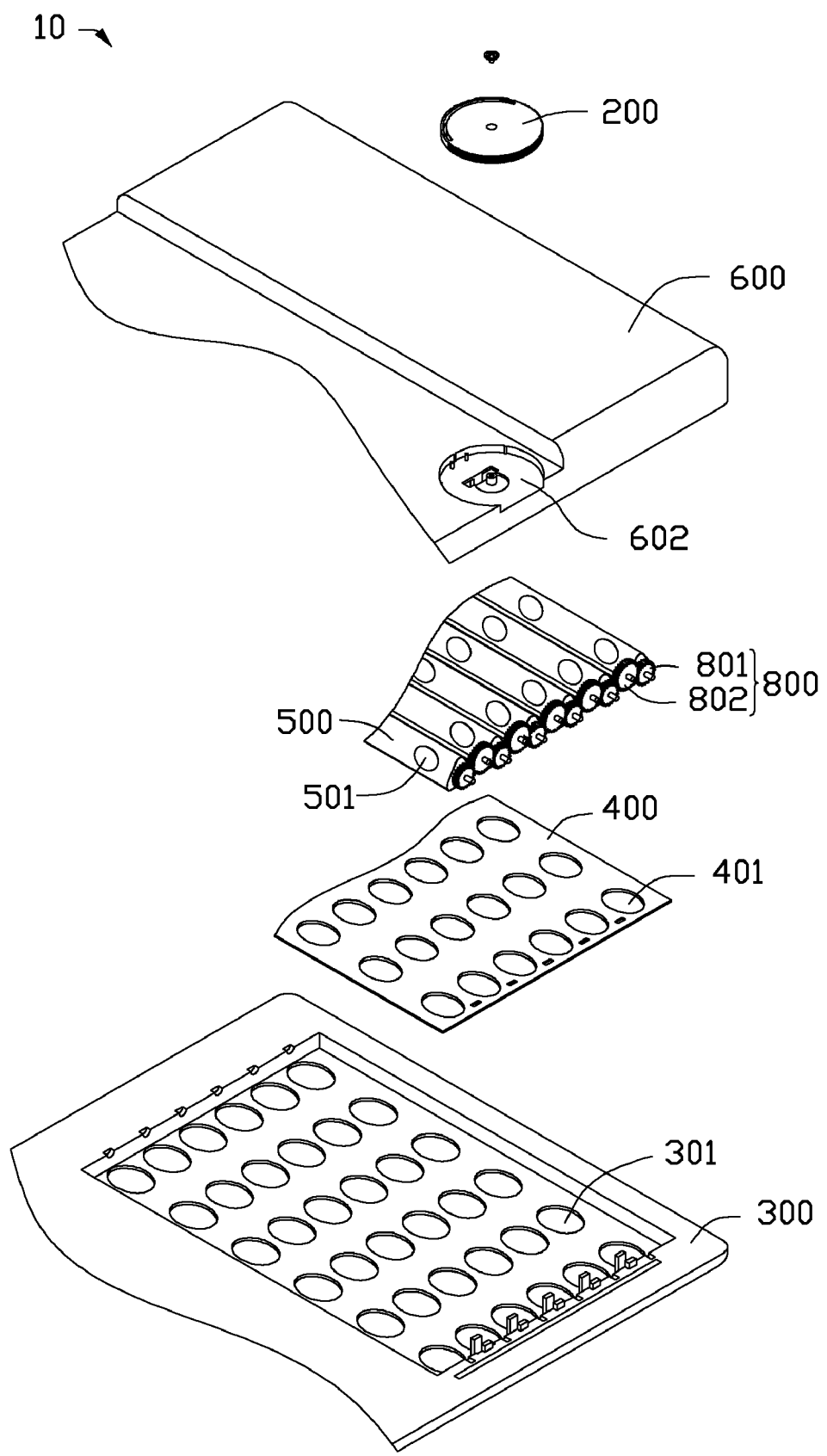
FIG. 3 is a partial, exploded perspective view of the electronic device of FIG. 1, viewed from another aspect.

Referring to FIG. 2 and FIG. 3, the electronic device 10 includes a first casing 300 and a second casing 700. The first casing 300 and the second casing 700 are coupled together to form an interior space for receiving a pressable plate 400, a plurality of rotatable members 500, and a base 600.

A plurality of button holes 301 are defined in the first casing 300. The pressable plate 400 includes a plurality of transparent pressable protrusions 401. When the pressable plate 400 is secured to the first casing 300, each of the pressable protrusions 401 exposes itself the first casing 300 through a corresponding button hole 301 of the first casing 300, such that a user can press the pressable protrusions 401 to input symbols or commands to the electronic device 10.

Each of the rotatable members 500 are substantially elongated posts, and includes at least two surfaces and a plurality of touch points 501 arranged on each surface along the longitudinal direction and corresponding to the layout of the pressable protrusions 401. Each of the touch points 501 is assigned and labeled with a symbol, such as a capital letter, a number, or the like. The rotatable members 500 are rotated by a transmission mechanism 800 which is further driven by the knob 200 (see FIG. 8). In the exemplary embodiment, the transmission mechanism 800 is a gear group including a plurality of first gears 801 and a plurality of second gears 802. Each of the first gears 801 is provided to rotate a rotatable member 500, and each of the second gears 802 is engaged with two adjacent first gears 802.

A first receiving space 601 is defined in the front of the base 600 for receiving the rotatable members 500 and the transmission mechanism 800. A second receiving space 602 is defined in the back of the base 600 for receiving the knob 200. The knob 200 is rotatable in the second receiving space 602.

Figure 4:
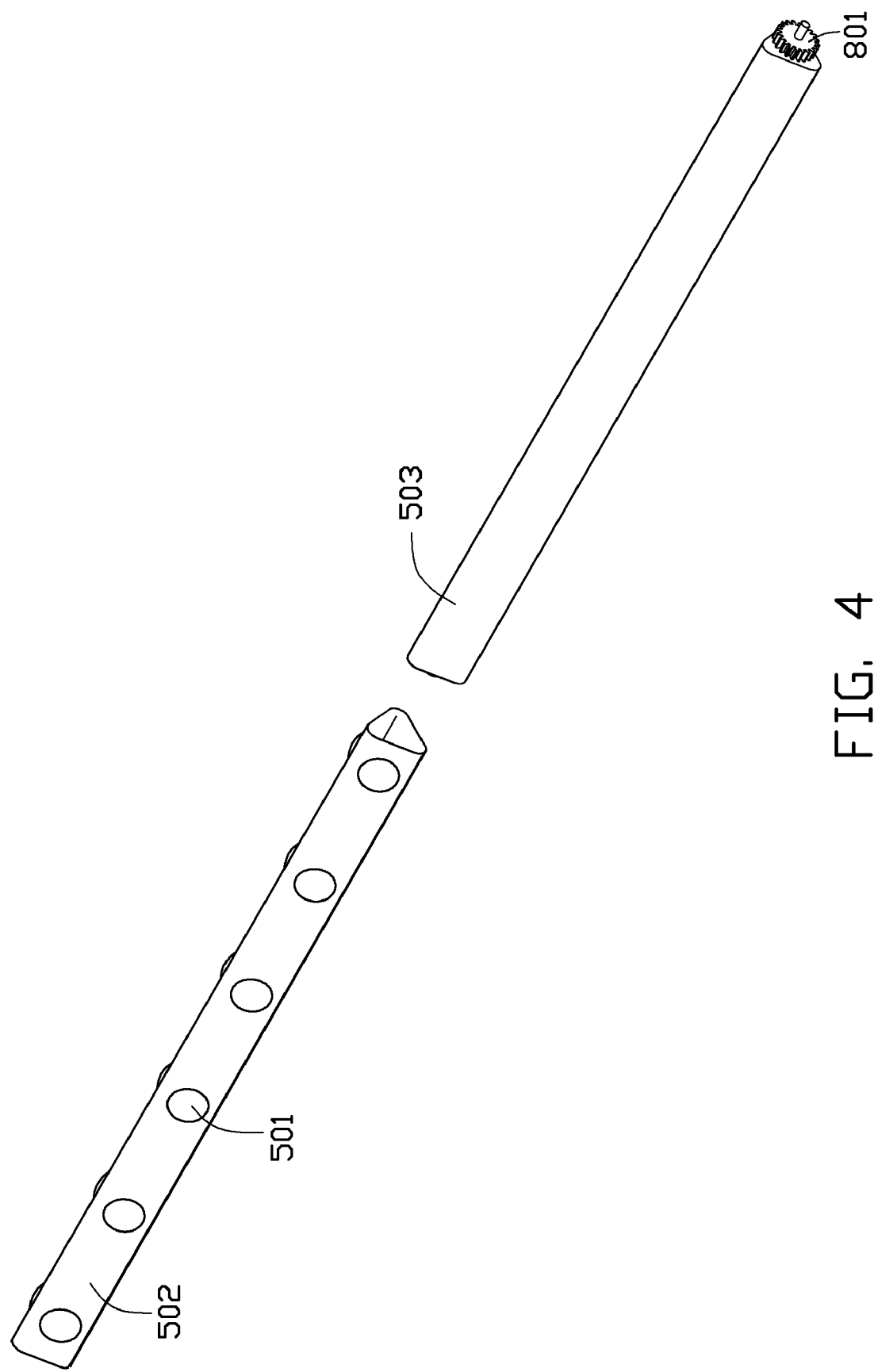
FIG. 4 is an exploded perspective view of a rotatable member of the electronic device of FIG. 2.

Referring to FIG. 4, each rotary member 500 includes a soft circuit plate 502 and a rotatable post 503. In the exemplary embodiment, each rotatable post 503 is a triangular prism covered by the soft circuit plate 502. The touch points 501 are arranged on the soft circuit plates 502.

Figure 5:
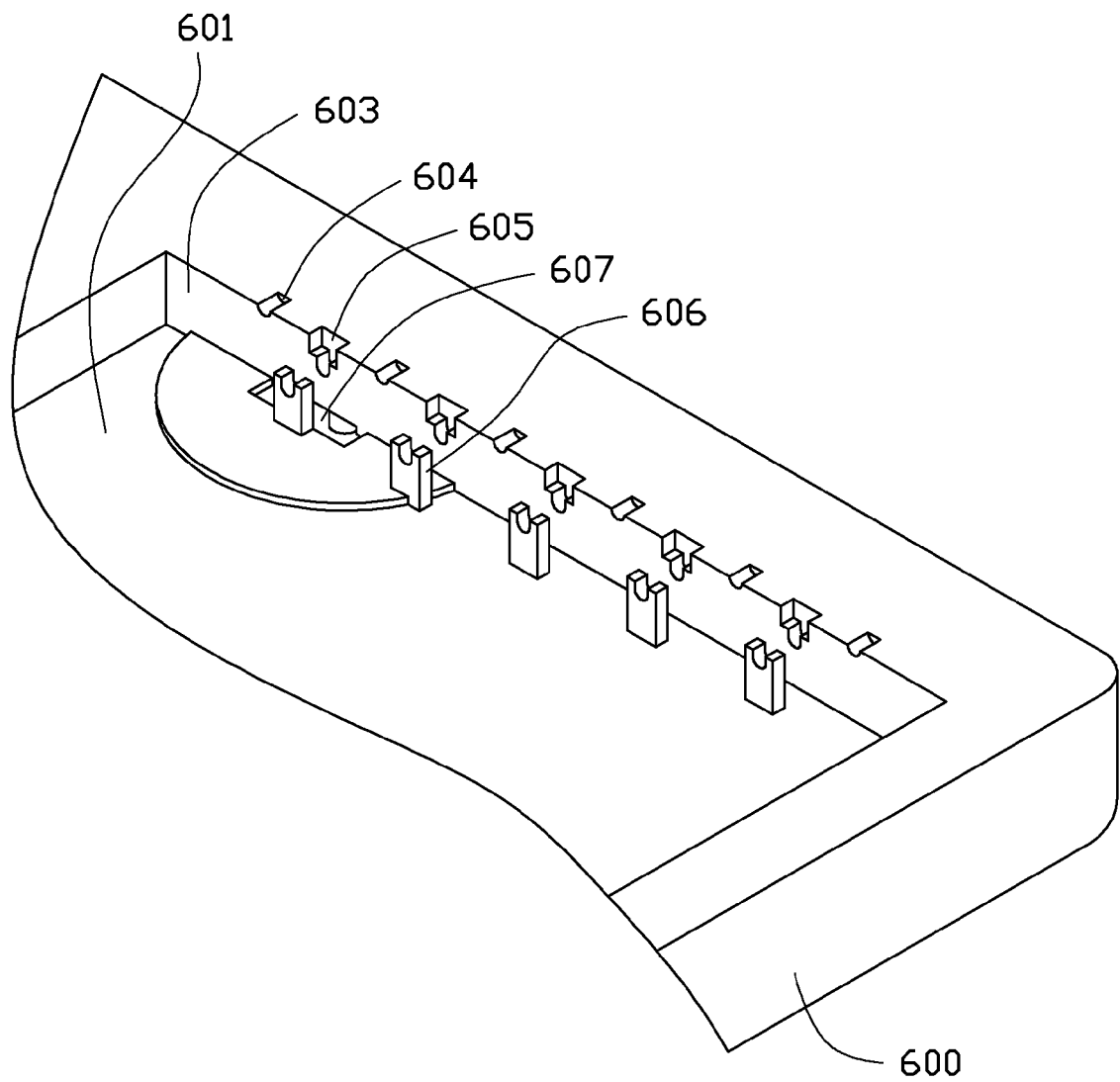
FIG. 5 is a partial, perspective view of a base of the electronic device of FIG. 2.

Referring to FIG. 5, a plurality of first supporting sections 604 are symmetrically defined on two opposite sidewalls (one is labeled 603) of the first receiving space 601. The first supporting sections 604 are provided for supporting the rotatable members 500 and the first gears 801. A plurality of second supporting sections 605 are also defined on the sidewall 603 of the first receiving space 601, and each second supporting section 605 is distributed between two adjacent first supporting sections 604. A plurality of supporting members 606 are mounted in the first receiving space 601. Each supporting member 606 is opposite to a second supporting section 605 and cooperates with the second supporting sections 605 to support a second gear 802.

Figure 6:
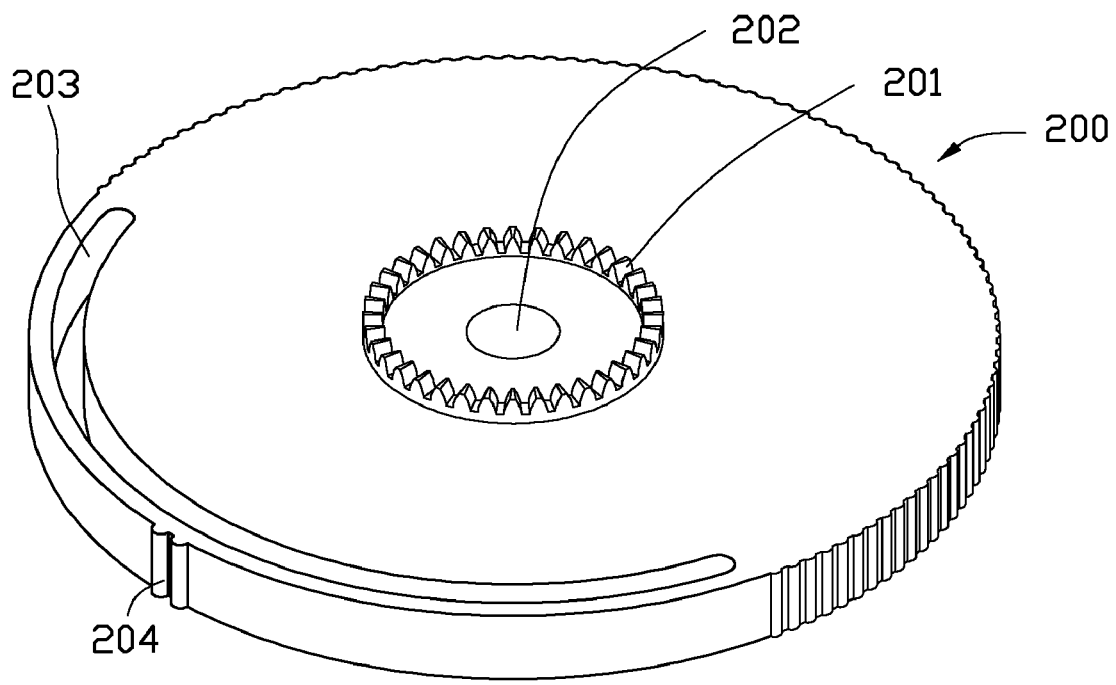
FIG. 6 is an isometric view of a knob of the electronic device of FIG. 2.
Figure 7:
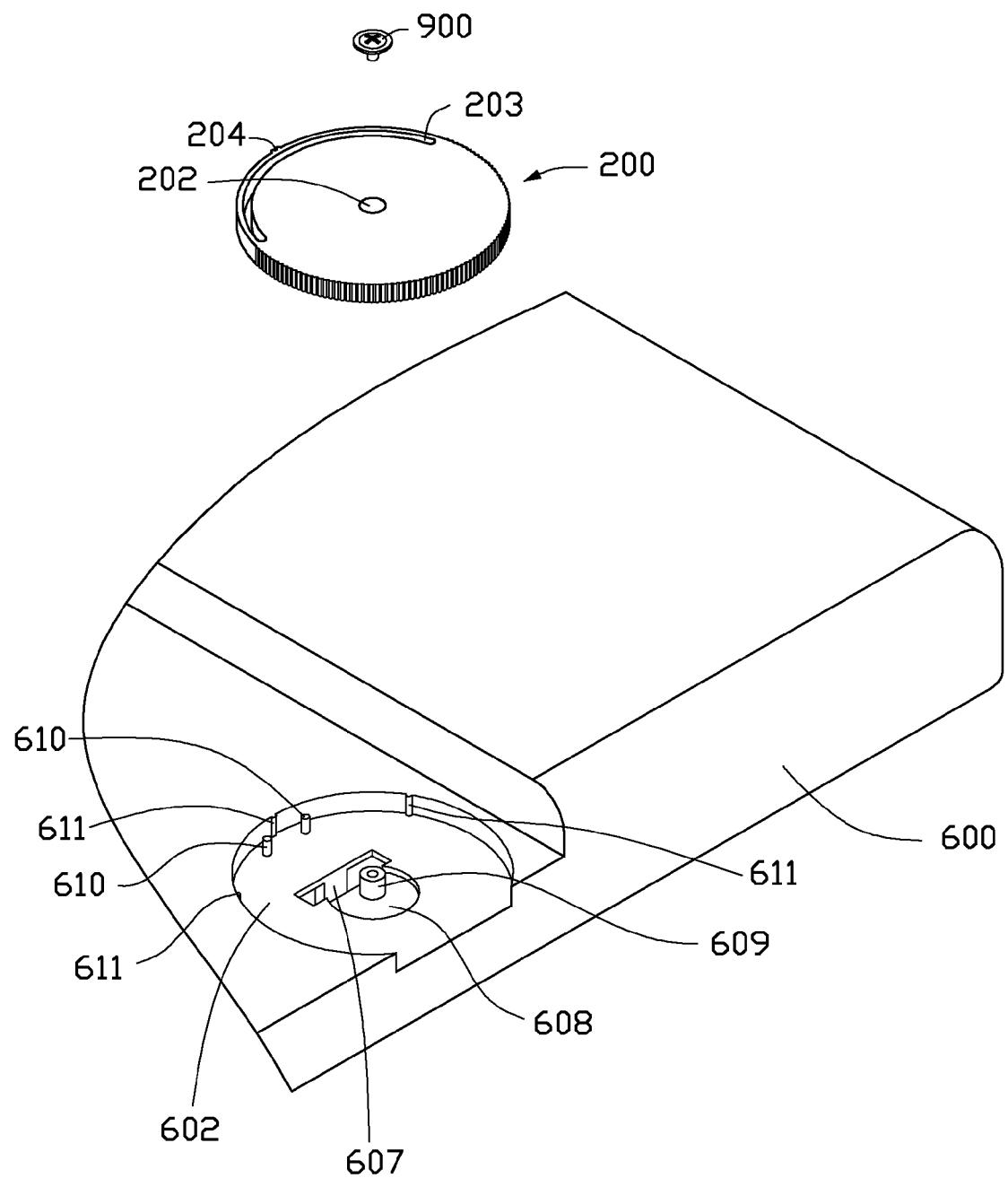
FIG. 7 is a partial, perspective view of the base of the electronic device and the knob of FIG. 2, viewed from another aspect.
Figure 8:
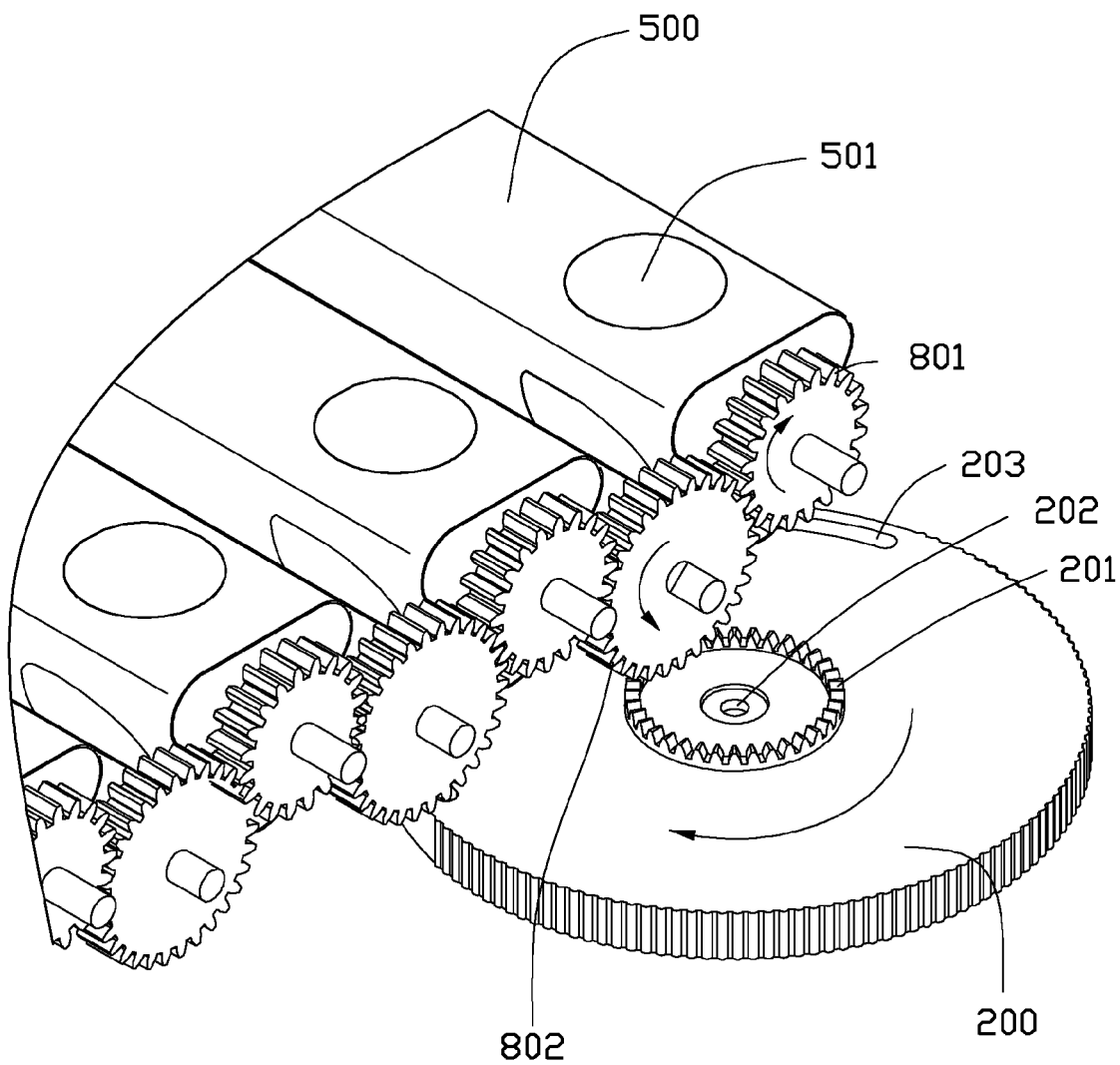
FIG. 8 is a partial, perspective view of a transmission mechanism of the electronic device of FIG. 2.

Referring to FIGS. 6-8, a crown gear 201 is mounted in the center of the knob 200 and a shaft hole 202 is defined in the center of the crown gear 201. An arced groove 203 is defined along a periphery of the knob 200. A latching protrusion 204 protrudes out from the sidewall of the knob 200.

A gear receiving space 608 is defined in the second receiving space 602 for receiving the crown gear 201. The gear receiving space 608 communicates with a through hole 607. A positioning post 609 is mounted in the center of the gear receiving space 608, and is received in the shaft hole 202 of the crown gear 201 when the knob 200 is received in the second receiving space 602. At least one limiting post 610 is mounted in the second receiving space 602. The limiting post 610 is received in the arced groove 203 when the knob 200 is received in the second receiving space 602. At least two stopper portions 611 protrude out from the sidewall of the second receiving space 602. In the exemplary embodiment, the number of the stopper portions 611 is equal to the number of the surfaces of a rotatable member 500. The latching protrusion 204 is provided for latching a stopper portion 611 during a rotation of the knob 200, therefore to keep the knob 200 in a position where one surface of each of the rotatable members 500 faces the pressable plate 400. The touch points 501 on the surfaces facing the pressable plate 400 are touchable and corresponding symbols or commands are inputted to the electronic device 10 when those touch points 501 are touched by the user who press the corresponding pressable protrusions 401. The latched stopper portions 611 is kept engaged with the latching protrusion 204 until the knob 200 is rotated forward or backward by the user.

A bolt 900 is also provided. The bolt 900 is screwed onto the positioning post 609 to secure the knob 200 to the base 600. The second receiving space 602 has an opening formed in a sidewall of the base 600. The opening exposes portion of the knob 200 to the user. The exposed portion of the knob 200 is provided for the user to rotate the knob 200. Portions of the gear teeth of the crown gear 201 extend through the through hole 607 and engage with a second gear 802 disposed above the through hole 607. In the exemplary embodiment, the crown gear 201 is rotated by the knob 200, and the crown gear 201 further rotates the second gear 802 disposed above the through hole 607, therefore to drive the transmission mechanism 800 to rotate the rotatable members 500.

The limiting post 610 limits the rotation range of the knob 200 in the second receiving space 602. The knob 200 is prevented from being rotated further when the limiting post 610 resists one end of the arced groove 203.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device with a rotatable keyboard, comprising a casing and a base,
   wherein:
   a plurality of button holes are defined on the casing;
   a pressable plate comprising a plurality of transparent pressable protrusions is secured to the casing, and each of the pressable protrusions exposes itself through a corresponding button hole of the casing for a user to press the pressable protrusions to input commands to the electronic device;
   at least one rotatable member is located below the pressable plate and mounted in the base, and comprises a soft circuit plate, the soft circuit plate comprises at least two surfaces, and a plurality of touch points are arranged on each surfaces of the soft circuit plate and corresponding to the layout of the pressable protrusions;
   a transmission mechanism is mounted in the base and configured for rotating the at least one rotatable member to make one surface of the at least one rotatable member face the pressable plate and the touch points on the surface being touchable by the user who press the pressable protrusions; and
   a knob is mounted in the base and configured for driving the transmission mechanism to rotate the at least one rotatable member.

2. The electronic device as described in claim 1, wherein a first receiving space is defined in a front of the base for receiving the at least one rotatable member and the transmission mechanism.

3. The electronic device as described in claim 2, wherein each rotatable member further comprises a rotatable post covered by the soft circuit plate.

4. The electronic device as described in claim 3, wherein the transmission mechanism comprises at least one first gear and at least one second gear, the first gear is provided for rotating the rotatable post, and the second gear, driven by the knob, is engaged with the first gear to rotate the first gear.

5. The electronic device as described in claim 4, wherein at least one first supporting section is defined on a sidewall of the first receiving space for supporting the at least one rotatable member and the at least one first gear, at least one second supporting section is defined on the sidewall of the first receiving space, at least one supporting post is mounted in the first receiving groove oppositely to the second supporting section and cooperates with the second supporting section to support the second gear.

6. The electronic device as described in claim 5, wherein a second receiving space is defined in a back of the base, the knob is received in the second receiving space and a portion of the knob is exposed to the outside for the user to operate the knob.

7. The electronic device as described in claim 6, wherein a crown gear is mounted in the center of the knob, a gear receiving space communicating with a through hole is defined in the second receiving space for receiving the crown gear, portions of gear teeth of the crown gear extend through the through hole and engage with a second gear disposed above the through hole, the crown gear is configured for rotating the second gear disposed above the through hole via the rotation of the knob, and thereby rotating the transmission mechanism.

8. The electronic device as described in claim 6, wherein a latching protrusion protrudes out from a sidewall of the knob, and at least two stopper portions protrude out from the sidewall of the second receiving space, the latching protrusion is configured for latching one of the stopper portions during a rotation of the knob, causing the knob to stay in a position where one surface of the rotatable member faces the pressable plate.

9. The electronic device as described in claim 6, wherein an arced groove is defined along a periphery of the knob, a limiting post is mounted in the second receiving space, the limiting post extends into the arced groove of the knob to limit a rotation range of the knob.

10. The electronic device as described in claim 6, wherein a shaft hole is defined in the center of the knob, a positioning post is mounted in the second receiving space and is received in the shaft hole of the knob, and a bolt is screwed onto the positioning post to secure the knob to the base.

* * * * *